(12) United States Patent
Fujimaki et al.

(10) Patent No.: US 7,102,707 B2
(45) Date of Patent: Sep. 5, 2006

(54) LIQUID-CRYSTAL DISPLAY DEVICE

(75) Inventors: Eriko Fujimaki, Kanagawa (JP); Sounosuke Takahashi, Kanagawa (JP)

(73) Assignee: NEC LCD Technologies, Ltd., Kanagawa (JP)

(*) Notice: Subject to any disclaimer, the term of this patent is extended or adjusted under 35 U.S.C. 154(b) by 9 days.

(21) Appl. No.: 10/406,689

(22) Filed: Apr. 3, 2003

(65) Prior Publication Data

US 2004/0008299 A1 Jan. 15, 2004

(30) Foreign Application Priority Data

Apr. 3, 2002 (JP) .................................. 2002-101066

(51) Int. Cl.
G02F 1/1335 (2006.01)

(52) U.S. Cl. ........................ 349/106; 349/110
(58) Field of Classification Search ............. 349/106, 349/110, 128, 127, 176, 177, 158, 157

See application file for complete search history.

(56) References Cited

U.S. PATENT DOCUMENTS 6,552,765 B1 * 4/2003 Kurata .................... 349/113

FOREIGN PATENT DOCUMENTS

| JP | 10-48641 | 2/1998 |
| JP | 2000-186225 | 7/2000 |
| JP | 2000-193983 | 7/2000 |
| JP | 2000-329923 | 11/2000 |
| JP | 2001-305332 | 10/2001 |
| JP | 2003-139936 | 5/2003 |
| KP | 10-104640 | 4/1998 |

OTHER PUBLICATIONS

English–language Abstract of Japanese Laid–Open Patent Publication No. 2003–139936, dated May 14, 2003.
English–language Abstract of Japanese Laid–Open Patent Publication No. 10–48641, dated Feb. 20, 1998.
English–language Abstract of Japanese Laid–Open Patent Publication No. 10–104640, dated Apr. 24, 1998.
English–language Abstract of Japanese Laid–Open Patent Publication No. 2000–193983, dated Jul. 14, 2000.
English–language Abstract of Japanese Laid–Open Patent Pubication No. 2000–329923, dated Nov. 30, 2000.

* cited by examiner

Primary Examiner—David Nelms
Assistant Examiner—Thinh T Nguyen
(74) Attorney, Agent, or Firm—Scully, Scott, Murphy & Presser, P.C.

(57) ABSTRACT

A LCD device prevents the color irregularities (e.g., the red-color irregularity) from occurring without complicating the fabrication processes of a color filter. Switching elements are formed on a first substrate. A color layer is formed on a second substrate. The color layer has a red sublayer, a green sublayer, and a blue sublayer. A liquid-crystal layer is located between the first and second substrates The second substrate includes no electrodes formed in such a way as to be located on a side nearer to the liquid-crystal layer with respect to the color layer. A green-coloring composition forming the green sublayer contains a pigment having a copper phthalocyanine skeleton. A ratio in weight of the pigment with respect to the green-coloring composition is equal to or less than approximately 27%.

13 Claims, 9 Drawing Sheets

SAMPLE A
(GREEN PIGMENT CONCENTRATION: 19.9 wt%)

SAMPLE A
(GREEN PIGMENT CONCENTRATION: 19.9 wt%)

SAMPLE B
(GREEN PIGMENT CONCENTRATION: 25.5 wt%)

SAMPLE B
(GREEN PIGMENT CONCENTRATION: 25.5 wt%)

SAMPLE D
(GREEN PIGMENT CONCENTRATION: 28.4 wt%)

SAMPLE D
(GREEN PIGMENT CONCENTRATION: 28.4 wt%)

LIQUID-CRYSTAL DISPLAY DEVICE

BACKGROUND OF THE INVENTION

1. Field of the Invention

The present invention relates generally to a liquid-crystal display (LCD) device. More particularly, the invention relates to a LCD device of the type having a first substrate on which switching elements are formed, a second substrate on which a color layer is formed, and a liquid-crystal layer located between the first and second substrates; and a method of evaluating the LCD device, where the second substrate includes no electrodes formed at nearer positions to the liquid-crystal layer with respect to the color layer. A known structure of this type is the "In-Plane Switching (IPS) type LCD device.

2. Description of the Related Art

Active-matrix addressing LCD devices, which use Thin-Film Transistors (TFTs) as switching elements for pixels and which are capable of providing high-grade image quality, have been extensively used as monitoring devices (or, monitors) for space-saving desktop computers or the like.

As the operation mode of active-matrix addressing LCD devices, two modes, i.e., the Twisted Nematic (TN) mode and the IPS mode, have been already known. With the TN mode, initially aligned liquid-crystal molecules in the liquid-crystal layer are rotated around a direction perpendicular to the first and second transparent substrates on operation. Unlike this, with the IPS mode, initially aligned liquid-crystal molecules in the liquid-crystal layer are rotated in a plane approximately parallel to the first and second transparent substrates on operation.

With the IPS mode LCD device, pixel electrodes and common electrodes are alternately formed on the TFT substrate in such a way as to form comb-teeth in the respective pixel areas. A voltage is applied across the pixel electrodes and the common electrodes to generate desired electric field approximately parallel to the TFT substrate in the liquid-crystal layer, thereby changing the alignment direction of the liquid-crystal molecules in the desired pixel areas. In this way, the amount of the light penetrating through the liquid-crystal layer is controlled as desired, generating images on the screen of the device. As seen from this explanation, the liquid-crystal molecules are rotated or twisted in an approximately parallel plane to the TFT substrate and thus, there is a feature that good images are displayable within a wider viewing angle compared with the TN mode LCD device.

A prior-art structure of the IPS-type LCD device is explained below with reference to FIG. 1.

As shown in FIG. 1, the prior-art IPS-type LCD device comprises a first substrate (i.e., a Thin-Film Transistor (TFT) substrate) S101, a second substrate (i.e., a color filter (CF) substrate) S102 located parallel to the substrate S101, and a liquid-crystal layer 110 sandwiched by these substrates S101 and S102.

The TFT substrate S101 comprises a first transparent plate 101, an interlayer dielectric layer 104 formed on the inner surface of the plate 101, a passivation layer 108 formed on the layer 104, and an alignment layer 109a formed on the layer 108. Scanning lines (not shown) are formed in parallel to each other on the plate 101. Signal lines (not shown) are formed in parallel to each other on the layer 104. The scanning lines and the signal lines are perpendicular to each other, forming pixel areas at their intersections. TFTs (not shown) are formed at the respective pixel areas (i.e., the respective intersections of the scanning lines and the signal lines) in a matrix array. In each of the pixel areas, a pixel electrode 107 and a common electrode 103 are formed in such a way as to form comb teeth. All the common electrodes 103 arranged at the respective pixels are electrically connected to each other by way of common electrode lines (not shown), to which a common electric potential is applied on operation.

The CF substrate S102 comprises a second transparent plate 111. A patterned black matrix 112 for preventing unwanted light from penetrating through the substrate S102 and a patterned color layer 113 for displaying color images are formed on the inner surface of the plate 111. The matrix 112 and the layer 113 cover almost all the inner surface of the plate 111. The layer 113 includes sublayers for red (R), green (g), and blue (B) colors. An overcoat layer 114 is formed on the black matrix 112 and the color layer 113 to protect the same. The combination of the black matrix 112, the color layer 113, and the overcoat layer 114 is termed the color filter (CF). An alignment layer 109b is formed on the layer 114. On the other hand, a conductive layer 115 is formed on the outer surface of the plate 111.

The alignment layers 109a and 109b, which are opposite to each other by way of the liquid-crystal layer 110, are used to align homogeneously the liquid-crystal molecules in the layer 110 in a predetermined direction (i.e., the initial alignment direction), which has a specified angle with respect to the longitudinal axis of the pixel electrodes 107.

A polarizer plate 116a is attached to the outer surface of the first plate 101. A polarizer plate 116b is attached to the outer surface of the conductive layer 115. The polarization axis of the plate 116a is perpendicular to that of the plate 116b. One of the polarization axes of the plates 116a and 116b is set to be parallel to the above-described initial alignment direction of the liquid-crystal molecules.

On operation, electric potential is selectively applied to the pixel electrodes 107 as necessary by way of the TFTS, thereby forming lateral electric field between the pixel electrodes 107 and the corresponding common electrodes 103. Thus, in the selected pixels, the liquid-crystal molecules are rotated (in other words, the molecules are twisted) in a plane parallel to the substrates S101 and S102, thereby displaying desired images on the screen.

The reference numeral 117 shown in FIG. 1 denotes an electric line of force generated by the voltage between to the common electrode 103 and the pixel electrode 107 in each pixel.

The LCD device of this type has ever been used mainly for monitors for notebook-type and desktop-type personal computers. However, recently, it has become used in other fields such as television (TV) and multimedia. Thus, there is the need to not only to improve the viewing angle characteristics but also to widen the chromaticity. With the visual instruments (e.g., TV monitors) designed for the TV field, the transmission method of picture signals including the hue has already been standardized. A typical one of the standards relating to the picture signal transmission is "NTSC" (National Television System Committee) employed in the U.S.A. and Japan. Another is "EBU" (European Broadcasting Union) employed in European countries. To expand the application of LCD devices to the TV and multimedia fields in the future, it is necessary to fabricate LCD devices in such a way as to meet both of the standards, NTSC and EBU.

Conventionally, LCD devices have been fabricated to satisfy the NTSC standard that requires the devices to have a chromaticity region of approximately 60%. On the other hand, to satisfy the EBU standard that requires the devices to have a chromaticity region of approximately 70%, constituting elements or parts of a LCD device have to be improved. In particular, the optical characteristic of the color filter has to be improved. To cope with the improvement required, the kind and combination/arrangement of a pigment or pigments used for the color filter needs to be adjusted or coordinated.

On the other hand, various display defects or failure caused by the optical characteristic of constituting elements and/or the characteristic of liquid crystal have been known. One of the defects is termed the "white-color irregularity", which is caused by the color filter. The "white-color irregularity" is a phenomenon that when voltage is applied to all the pixel electrodes to thereby display a black image on the entire screen, irregularity or unevenness of darkness is observed on the screen. This is because the transmittance is kept unequal to zero at a part of the pixels even if voltage is applied to all the pixel electrodes. The cause of the white-color irregularity is thought that unwanted electric current flows through ionic substance existing in the liquid crystal, thereby lowering the voltage applied across the pixel electrode and the corresponding common electrode in the part of the pixels, although the voltage applied across the pixel electrode and the corresponding common electrode should be kept constant.

To suppress or prevent the white-color irregularity, some measures have been developed and disclosed. Examples of the measures are disclosed in the Japanese Non-Examined Patent Publication Nos. 2001-305332 published in Oct. 31 2001 and 2000-186225 published in Jul. 4, 2000, in which the "white-color irregularity" is suppressed by directing the attention to impurities contained in the color filter.

The measure disclosed in the Publication No. 2000-186225 is a method of producing a pigment for a color filter, in which fuming sulfuric acid or sulfuric acid is used as a solvent for chlorination and/or bromination of a compound having a copper phthalocyanine skeleton. In this method, the ionic impurities, which are likely to dissociate and to apply bad effects to the performance of a LCD device, are reduced. As a result, the "white-color irregularity" can be suppressed.

The measure disclosed in the Publication No 2001-305332 is a resin composition for a color filter, which contains a volatile component and a non-volatile component and which has a specific voltage-sustaining rate of a liquid crystal from which impurities have been extracted. This measure was developed on the following basis.

A resin member forming a color filter, which is contacted with a liquid crystal layer, was regarded as a source of ionic substances. Then, as a characteristic or characteristics having a correlation with the display defect caused by the ionic substances moved from the resin member to the liquid-crystal layer, attentions were paid to the voltage-sustaining rate of the liquid crystal and the remaining DC voltage (ΔE), where impurities were extracted from the components of the resin composition of the resin member.

With the above-described two measures, ionic substances containing in the color filter are reduced and therefore, the "while-color irregularity" can be suppressed. However, there is another display defect termed the "red-color irregularity". This defect is caused by the fact that the light penetrating through the green sublayers (which contain a green pigment) of the color layer is reduced and thus, the whole displayed image on the screen is observed reddish irregularly. Since the "red-color irregularity" is not caused by ionic substances existing in the color filter, this defect is unable to be prevented or eliminated by the above-described known measures.

SUMMARY OF THE INVENTION

Accordingly, an object of the present invention is to provide a LCD device of the above-described type that prevents effectively the color irregularities (in particular, the red-color irregularity) from occurring without complicating the fabrication processes of a color filter.

Another object of the present invention is to provide an evaluation method of a LCD device of the above-described type that makes it possible to evaluate conveniently and easily whether or not a time-varying potential defect exists in a LCD device.

Still another object of the present invention is to provide an evaluation method of a LCD device of the above-described type that makes it possible to know easily the long-term reliability of a LCD device.

The above objects together with others not specifically mentioned will become clear to those skilled in the art from the following description.

According to a first aspect of the present invention, a LCD device is provided, which comprises:

a first substrate on which switching elements are formed;

a second substrate on which a color layer is formed;

the color layer having a red sublayer, a green sublayer, and a blue sublayer;

a liquid-crystal layer located between the first and second substrates; and the second substrate including no electrodes formed in such a way as to be located on a side nearer to the liquid-crystal layer with respect to the color layer;

wherein a green-coloring composition forming the green sublayer contains a pigment having a copper phthalocyanine skeleton;

and wherein a ratio in weight of the pigment with respect to the green-coloring composition is equal to or less than approximately 27%.

With the LCD device according to the first aspect of the present invention, a green-coloring composition forming the green sublayer of the color layer contains a pigment having a copper phthalocyanine skeleton and at the same time, a ratio in weight of the pigment with respect to the green-coloring composition is equal to or less than approximately 27%. Therefore, the red-color irregularity is prevented from occurring without complicating the fabrication processes of a color filter.

In a preferred embodiment of the device according to the first aspect of the invention, wherein when an alternating-current electric field of 100 Hz to 1 MHz is applied to the color layer, a dielectric loss factor of the color layer satisfies a relationship of $$(\epsilon''_{100}/\epsilon''_{min}) < \text{approximately } 1.25$$

where $\epsilon''_{100}$ is a value of the dielectric loss factor at approximately 100 Hz, and $\epsilon''_{min}$ is a minimum value of the dielectric loss factor in a range from 100 Hz to 1 MHz.

In another preferred embodiment of the device according to the first aspect of the invention, when an alternating-current electric field of 1 MHz is applied to the color layer, a dielectric loss factor of the color layer satisfies a relationship of $$(\epsilon''_{subsequent}/\epsilon''_{initial}) < \text{approximately } 1.6$$

where $\epsilon''_{initial}$ is an initial value of the dielectric loss factor, and $\epsilon''_{subsequent}$ is a subsequent value of the dielectric loss factor obtained after a dielectric-current electric field is applied to the color layer as an electric-field stress for at least 72 hours.

In still another preferred embodiment of the device according to the first aspect of the invention, a chromaticity range is set at 65% or higher.

In a further preferred embodiment of the device according to the first aspect of the invention, the first substrate has scanning lines, signal lines extending perpendicular to the scanning lines, pixel electrodes formed at respective intersections of the scanning lines and the signal lines, and common electrodes applied commonly with an electric potential, thereby constituting an In-Plane Switching structure where liquid-crystal molecules in the liquid-crystal layer are rotated by a voltage applied across the pixel electrodes and the common electrodes in a plane approximately parallel to the first and second substrates.

According to a second aspect of the present invention, another LCD device is provided, which comprises:

a first substrate on which switching elements are formed;
a second substrate on which a color layer is formed;
the color layer having a red sublayer, a green sublayer, and a blue sublayer;
the green sublayer being formed by a green-coloring composition;
a liquid-crystal layer located between the first and second substrates; and
the second substrate including no electrodes formed in such a way as to be located on a side nearer to the liquid-crystal layer with respect to the color layer;
wherein when an alternating-current electric field of 100 Hz to 1 MHz is applied to the color layer, a dielectric loss factor of the color layer satisfies a relationship of $$(\epsilon''_{100}/\epsilon''_{min}) < \text{approximately } 1.25$$

where $\epsilon''_{100}$ is a value of the dielectric loss factor at approximately 100 Hz, and $\epsilon''_{min}$ is a minimum value of the dielectric loss factor in a range from 100 Hz to 1 MHz.

With the LCD device according to the second aspect of the present invention, when an alternating-current electric field of 100 Hz to 1 MHz is applied to the color layer, a dielectric loss factor of the color layer satisfies a relationship of $$(\epsilon''_{100}/\epsilon''_{min}) < \text{approximately } 1.25$$

where $\epsilon''_{100}$ is a value of the dielectric loss factor at approximately 100 Hz, and $\epsilon''_{min}$ is a minimum value of the dielectric loss factor in a range from 100 Hz to 1 MHz. Therefore, the "red-color irregularity" is prevented from occurring without complicating the fabrication processes of a color filter.

In a preferred embodiment of the device according to the second aspect of the invention, the green-coloring composition contains a pigment having a copper phthalocyanine skeleton.

In another preferred embodiment of the device according to the second aspect of the invention, a chromaticity range is set at 65% or higher.

In a still another preferred embodiment of the device according to the second aspect of the invention, the first substrate has scanning lines, signal lines extending perpendicular to the scanning lines, pixel electrodes formed at respective intersections of the scanning lines and the signal lines, and common electrodes applied commonly with an electric potential, thereby constituting an In-Plane Switching structure where liquid-crystal molecules in the liquid-crystal layer are rotated by a voltage applied across the pixel electrodes and the common electrodes in a plane approximately parallel to the first and second substrates.

According to a third aspect of the present invention, still another LCD device is provided, which comprises:

a first substrate on which switching elements are formed;
a second substrate on which a color layer is formed;
the color layer having a red sublayer, a green sublayer, and a blue sublayer;
the green sublayer being formed by a green-coloring composition;
a liquid-crystal layer located between the first and second substrates; and
the second substrate including no electrodes formed in such a way as to be located on a side nearer to the liquid-crystal layer with respect to the color layer;
wherein when an alternating-current electric field of 1 MHz is applied to the color layer, a dielectric loss factor of the color layer satisfies a relationship of $$(\epsilon''_{subsequent}/\epsilon''_{initial}) < \text{approximately } 1.6$$

where $\epsilon''_{initial}$ is an initial value of the dielectric loss factor, and $\epsilon''_{subsequent}$ is a subsequent value of the dielectric loss factor obtained after a dielectric-current electric field is applied to the color layer as an electric-field stress for at least 72 hours.

With the LCD device according to the third aspect of the present invention, when an alternating-current electric field of 1 MHz is applied to the color layer, a dielectric loss factor of the color layer satisfies a relationship of $$(\epsilon''_{subsequent}/\epsilon''_{initial}) < \text{approximately } 1.6$$

where $\epsilon''_{initial}$ is an initial value of the dielectric loss factor, and $\epsilon''_{subsequent}$ is a subsequent value of the dielectric loss factor obtained after a dielectric-current electric field is applied to the color layer as an electric-field stress for at least 72 hours. Therefore, the "red-color irregularity" is prevented from occurring without complicating the fabrication processes of a color filter.

In a preferred embodiment of the device according to the third aspect of the invention, the green-coloring composition contains a pigment having a copper phthalocyanine skeleton.

In another preferred embodiment of the device according to the third aspect of the invention, a chromaticity range is set at 65% or higher.

In a still another preferred embodiment of the device according to the third aspect of the invention, the first substrate has scanning lines, signal lines extending perpendicular to the scanning lines, pixel electrodes formed at respective intersections of the scanning lines and the signal lines, and common electrodes applied commonly with an electric potential, thereby constituting an In-Plane Switching structure where liquid-crystal molecules in the liquid-crystal layer are rotated by a voltage applied across the pixel electrodes and the common electrodes in a plane approximately parallel to the first and second substrates.

According to a fourth aspect of the present invention, a method of evaluating a LCD device is provided. The LCD device comprises:

a first substrate on which switching elements are formed;
a second substrate on which a color layer is formed;
the color layer having a red sublayer, a green sublayer, and a blue sublayer;

the green sublayer being formed by a green-coloring composition;

a liquid-crystal layer located between the first and second substrates; and the second substrate including no electrodes formed in such a way as to be located on a side nearer to the liquid-crystal layer with respect to the color layer.

The method comprises:

applying an alternating-current electric field of 100 Hz to 1 MHz to the color layer;

measuring a dielectric loss factor of the color layer under the alternating-current electric field;

calculating a ratio of ($\epsilon''_{100}/\epsilon''_{min}$)

where $\epsilon''_{100}$ is a value of the dielectric loss factor at approximately 100 Hz, and $\epsilon''_{min}$ is a minimum value of the dielectric loss factor in a range from 100 Hz to 1 MHz; and comparing the ratio of ($\epsilon''_{100}/\epsilon''_{min}$) with a specific value, thereby evaluating a display quality of the device.

With the evaluation method of a LCD device according to the fourth aspect of the present invention, an alternating-current electric field of 100 Hz to 1 MHz is applied to the color layer. A dielectric loss factor of the color layer is measured under the alternating-current electric field. A ratio of ($\epsilon''_{100}/\epsilon''_{min}$) is measured, where $\epsilon''_{100}$ is a value of the dielectric loss factor at approximately 100 Hz, and $\epsilon''_{min}$ is a minimum value of the dielectric loss factor in a range from 100 Hz to 1 MHz. The ratio of ($\epsilon''_{100}/\epsilon''_{min}$) is compared with a specific value, thereby evaluating a display quality of the device.

Therefore, whether or not a time-varying potential defect exists in a LCD device can be evaluated conveniently and easily without using the conventional method where the initial and subsequent behavior of a print of a finger contacted onto the display screen is observed. Moreover, the long-term reliability of a LCD device can be known easily.

In a preferred embodiment of the method according to the fourth aspect of the invention, if the ratio satisfies a relationship of ($\epsilon''_{100}/\epsilon''_{min}$)<approximately 1.25, the LCD device is judged good.

According to a fifth aspect of the present invention, another method of evaluating a LCD device is provided. The LCD device comprises:

a first substrate on which switching elements are formed;

a second substrate on which a color layer is formed;

the color layer having a red sublayer, a green sublayer, and a blue sublayer;

the green sublayer being formed by a green-coloring composition;

a liquid-crystal layer located between the first and second substrates; and the second substrate including no electrodes formed in such a way as to be located on a side nearer to the liquid-crystal layer with respect to the color layer.

The method comprises:

measuring a dielectric loss factor of the color layer under an application of an alternating-current electric field of 1 MHz, thereby obtaining an initial value $\epsilon''_{initial}$ of the dielectric loss factor;

applying a direct-current electric field to the color layer as an electric-field stress for at least 72 hours;

measuring a dielectric loss factor of the color layer after application of the alternating-current electric field for at least 72 hours, thereby obtaining a subsequent value $\epsilon''_{subsequent}$ of the dielectric loss factor;

calculating a ratio of ($\epsilon''_{subsequent}/\epsilon''_{initial}$); and comparing the ratio of ($\epsilon''_{subsequent}/\epsilon''_{initial}$) with a specific value, thereby evaluating a display quality of the device.

With the evaluation method of a LCD device according to the fifth aspect of the present invention, a dielectric loss factor of the color layer is measured under an application of an alternating-current electric field of 1 MHz, thereby obtaining an initial value $\epsilon''_{initial}$ of the dielectric loss factor. A direct-current electric field is applied to the color layer as an electric-field stress for at least 72 hours. A dielectric loss factor of the color layer after application of the alternating-current electric field for at least 72 hours is measured, thereby obtaining a subsequent value $\epsilon''_{subsequent}$ of the dielectric loss factor. A ratio of ($\epsilon''_{subsequent}/\epsilon''_{initial}$) is calculated. The ratio of ($\epsilon''_{subsequent}/\epsilon''_{initial}$) is compared with a specific value, thereby evaluating a display quality of the device.

Therefore, whether or not a time-varying potential defect exists in a LCD device can be evaluated conveniently and easily without using the conventional method where the initial and subsequent behavior of a print of a finger contacted onto the display screen is observed. Moreover, the long-term reliability of a LCD device can be known easily.

In a preferred embodiment of the method according to the fifth aspect of the invention, if the ratio satisfies a relationship of ($\epsilon''_{subsequent}/\epsilon''_{initial}$)<approximately 1.6, the LCD device is judged good.

BRIEF DESCRIPTION OF THE DRAWINGS

In order that the present invention may be readily carried into effect, it will now be described with reference to the accompanying drawings.

DETAILED DESCRIPTION OF THE INVENTION

Figure 1:
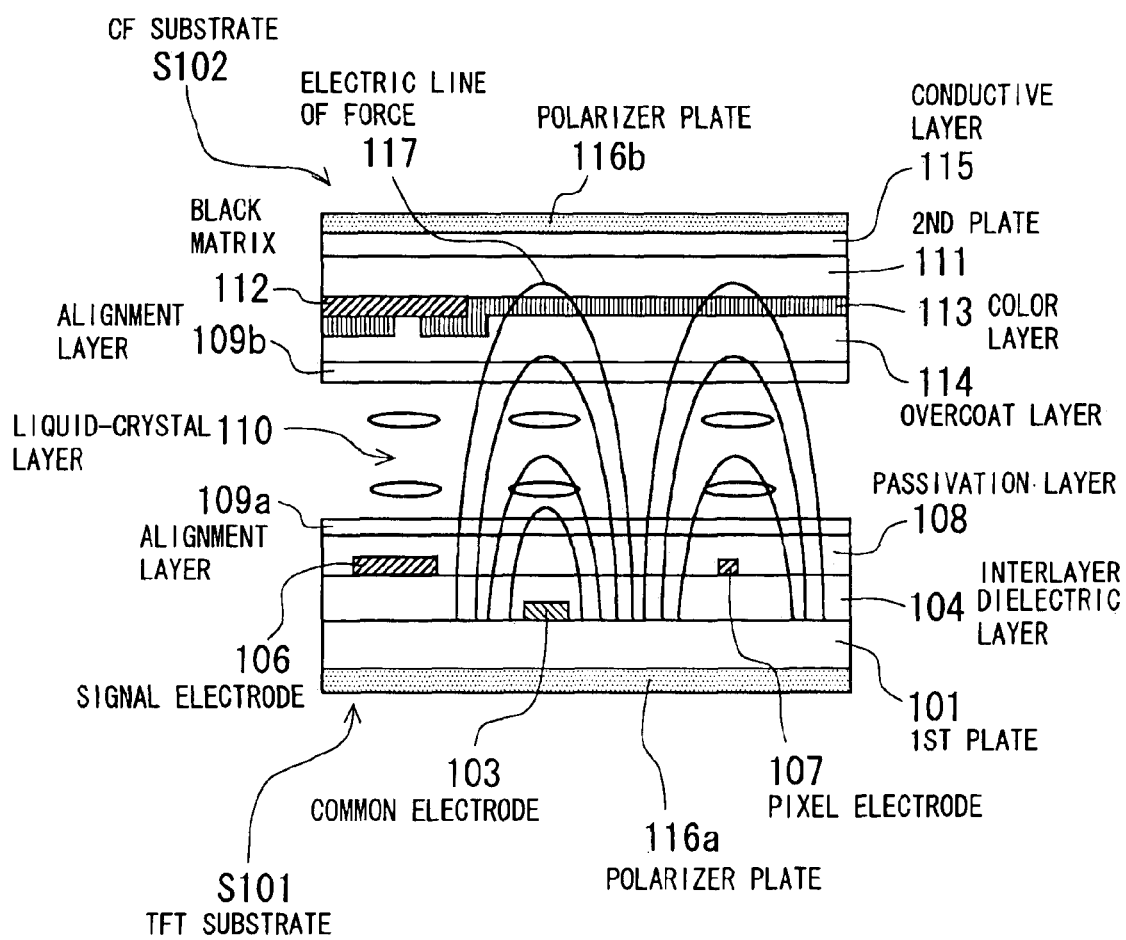
FIG. 1 is a schematic, partial cross-sectional view showing the configuration of a prior-art IPS type LCD device, in which a problem occurring in this device is shown.

The present invention will be described in more detail below while referring to the drawings attached.

The red-color irregularity, which is one of the display defects of LCD devices, will be observed conspicuously in the IPS mode LCD device where no electrodes are provided on the CF substrate. Then, the inventors investigated this problem zealously and as a result, they finally found the reason or cause of this problem.

Specifically, with the IPS mode LCD device, transparent electrodes, which are usually made of ITO (Indium Tin Oxide), are not provided on the CF substrate in such a way as to be located on the side nearer to the liquid-crystal layer with respect to the color layer. Therefore, the lateral electric field for driving the liquid crystal is likely to penetrate through the CF substrate. As a result, the lateral electric field is applied to the color layer formed on the CF substrate, thereby electrifying the color layer itself. The color layer thus electrified causes the display defect.

Since coloring compositions forming the sublayers of the color layer contain photoconductive phthalocyanine pigment, electric charge is generated in the color layer when the driving lateral electric field penetrates through the color filter. Although a part of the electric charge thus generated will go out of the inside of the color layer through the black matrix, the remaining electric charge will disappear due to the recombination or will accumulate in the color layer. The inventors thought that the display defect of the "red-color irregularity" was probably caused by the change due to the electric charge accumulated in the color layer.

As described above, it is thought that the red-color irregularity is due to the electrification of the color layer and therefore, this defect is unable to be prevented by the previously-described prior-art measures using a coloring composition containing less impurity. The inventors investigated some other measure and finally found that the red-color irregularity could be effectively prevented by using a physical property having a correlation with the concentration of the pigment contained in the color layer or the electrification of the color layer.

In particular, it was found that the electrification of the color layer has a correlation with a pigment of copper phthalocyanine halide contained in the green-coloring composition forming the green sublayer. Moreover, it was also found that the red-color irregularity could be prevented beforehand by limiting the concentration range of the pigment, and that the time-varying level of the red-color irregularity could be evaluated by measuring the complex permittivity of the color layer.

Concretely, to prevent the red-color irregularity, it is required that the green sublayer of the color layer has no electric charge. This is realized under the following conditions. Specifically, (i) the ratio in weight of the pigment contained in the green-coloring composition of the green sublayer with respect to the said green-coloring composition is equal to or less than approximately 27%, or (ii) a dielectric loss factor of the color layer has an initial frequency characteristic including an approximately flat area in the low-frequency region (i.e., including no raised area in the low-frequency region), and the increasing rate of the dielectric loss factor is kept in a specific range even after an electric-field stress is applied to the color layer for a long time. By satisfying one of the conditions (i) and (ii), no unwanted electric field that affects badly the driving electric field is generated and as a result, the display quality of the LCD device can be improved.

Figure 2A:
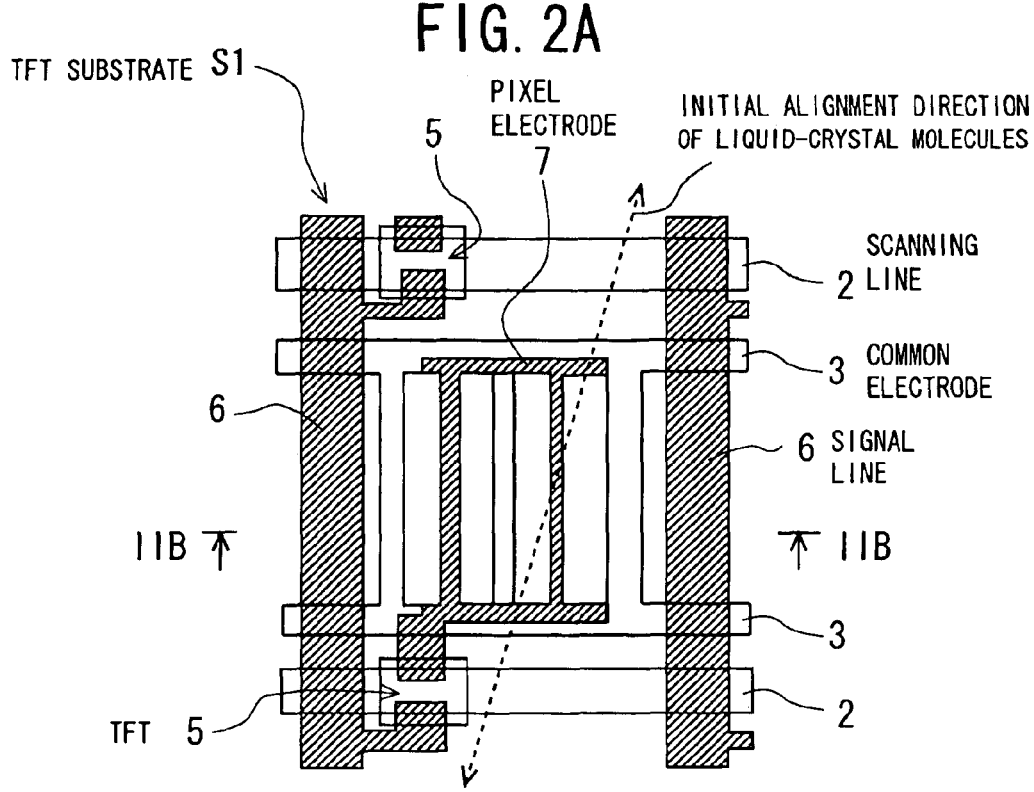
FIG. 2A is a schematic, partial plan view showing the configuration of an IPS type LCD device according to an embodiment of the invention.
Figure 2B:
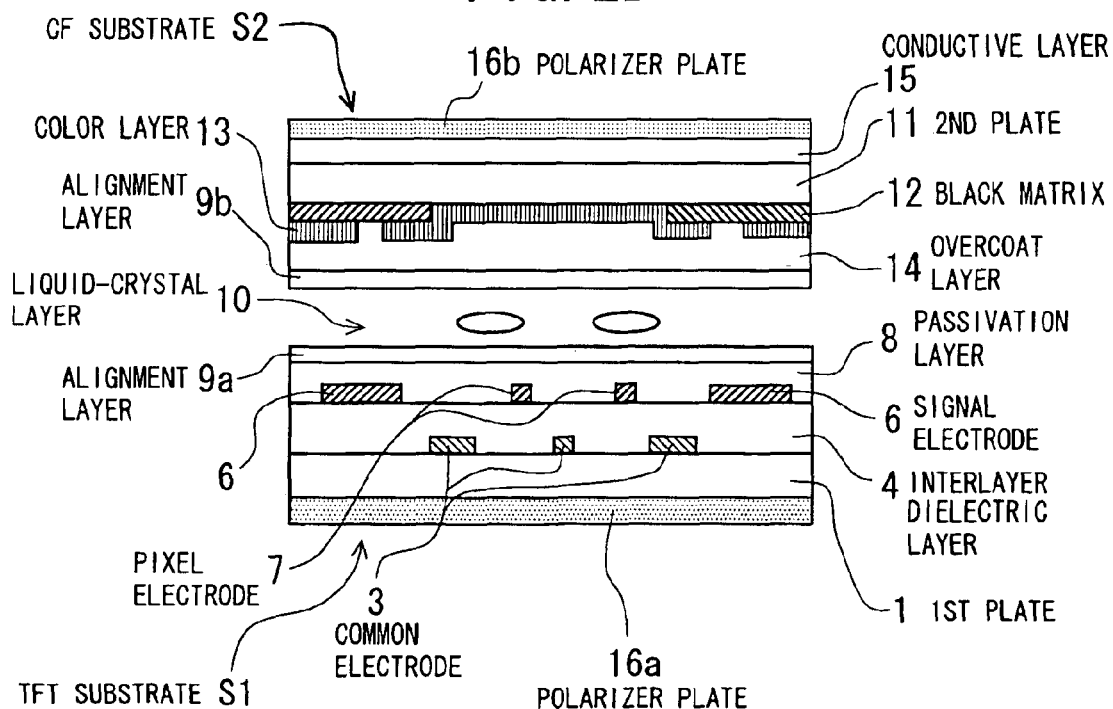
FIG. 2B is a schematic, partial cross-sectional view showing the configuration of the device according to the embodiment of the invention.
Figure 3:
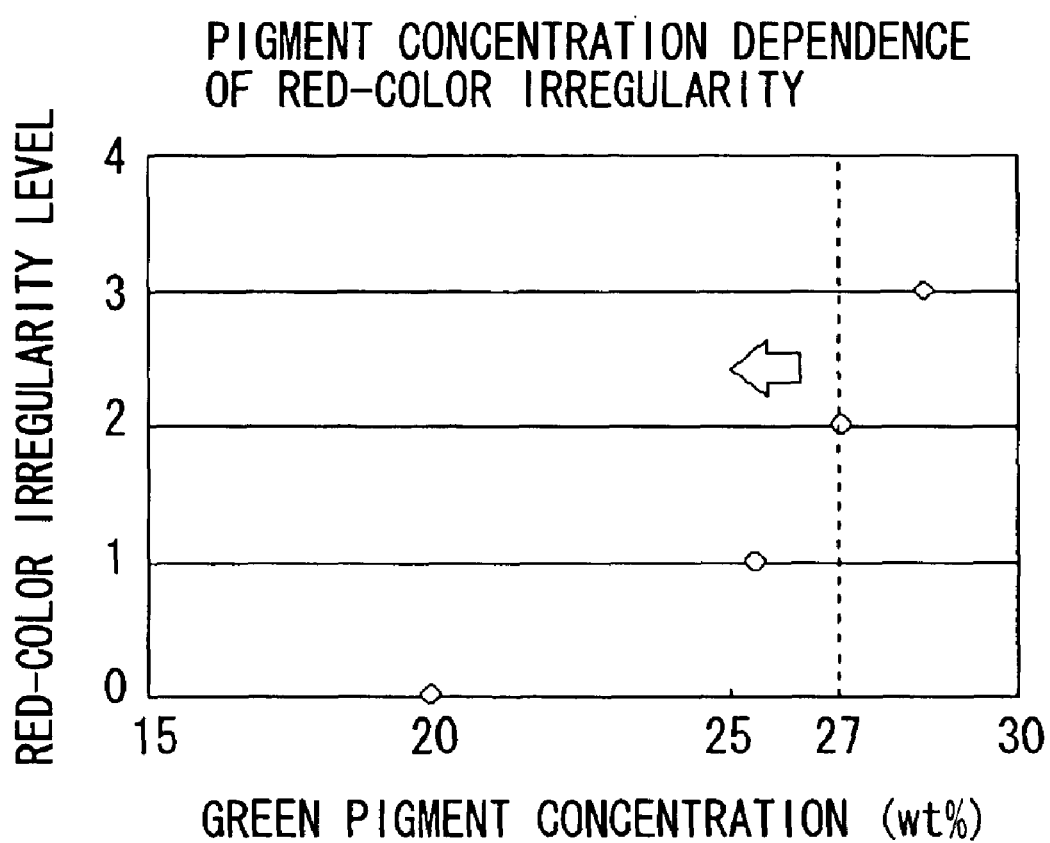
FIG. 3 is a graph showing the correlation between the green pigment concentration of the green sublayer of the color layer and the red-color irregularity level, which shows the advantage of the invention.
Figure 6A:
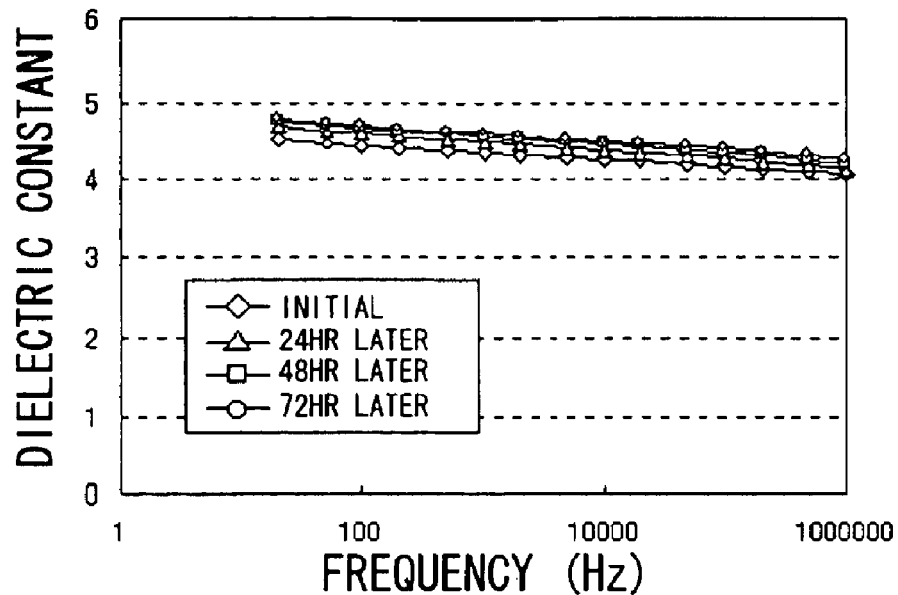
FIG. 6A is a graph showing the frequency characteristic of the dielectric constant of the sample C having a green pigment concentration of 27.0 wt % and its time-dependent change, which shows the advantage of the invention.
Figure 6B:
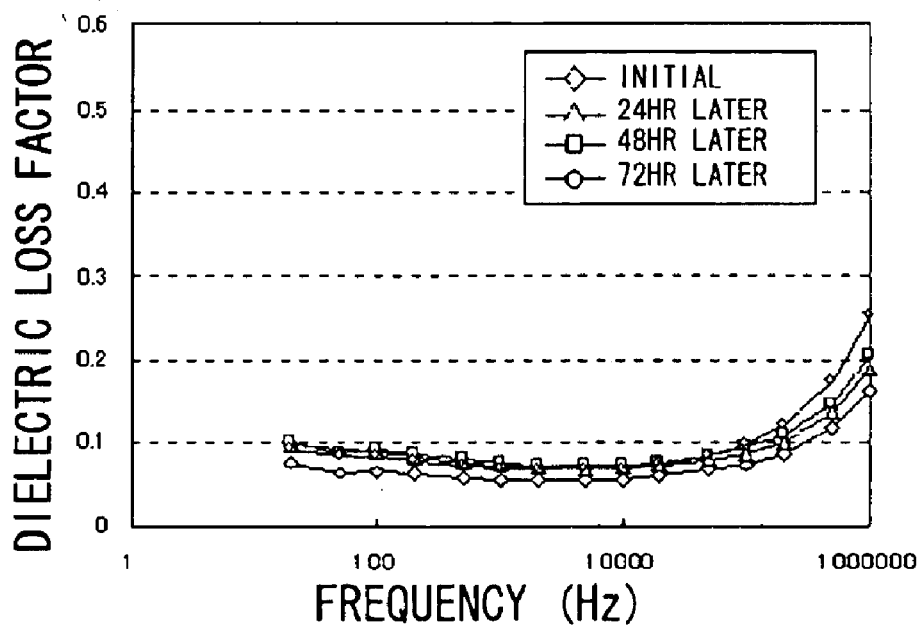
FIG. 6B is a graph showing the frequency characteristic of the dielectric loss factor of the sample C having a green pigment concentration of 27.0 wt % and its time-dependent change, which shows the advantage of the invention.
Figure 7A:
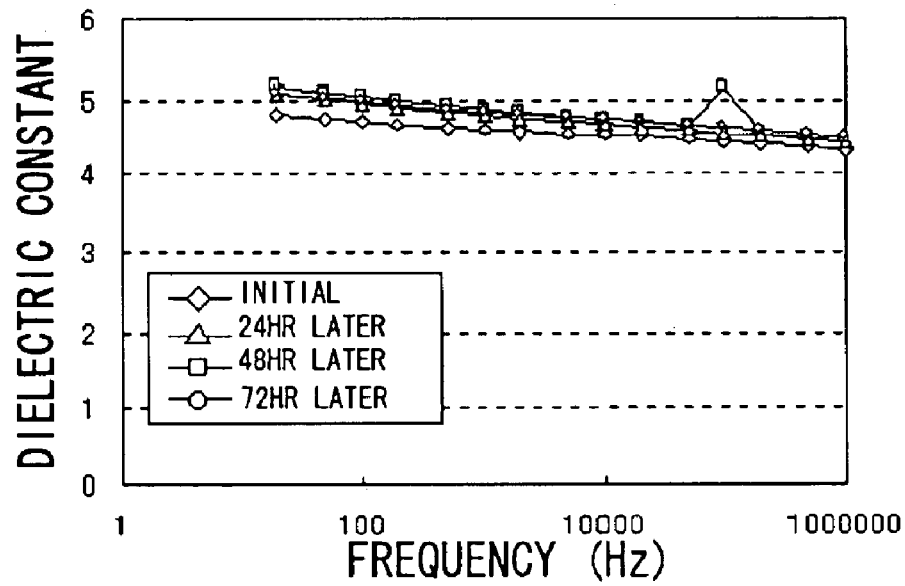
FIG. 7A is a graph showing the frequency characteristic of the dielectric constant of the sample D having a green pigment concentration of 28.4 wt % and its time-dependent change, which shows the advantage of the invention.
Figure 7B:
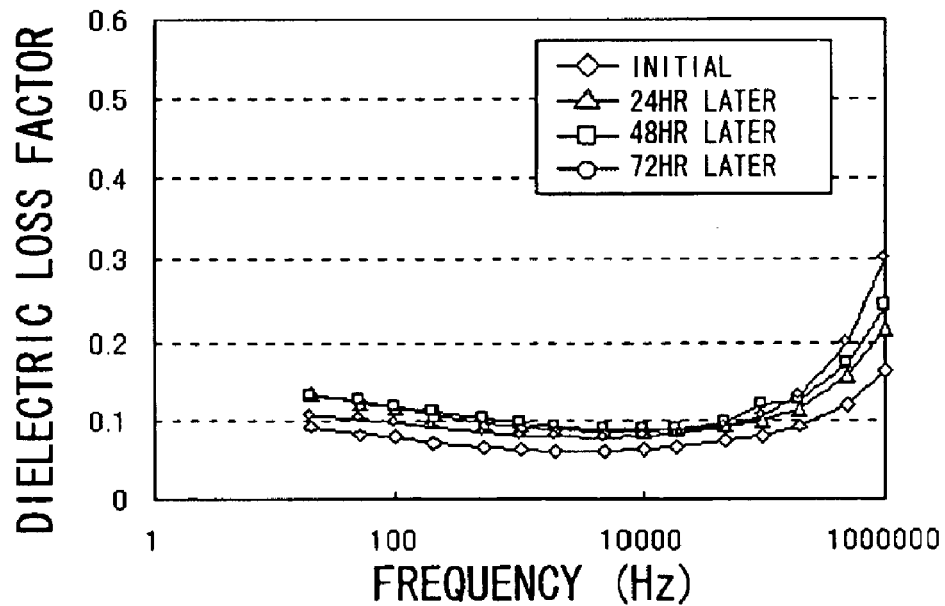
FIG. 7B is a graph showing the frequency characteristic of the dielectric loss factor of the sample D having a green pigment concentration of 28.4 wt % and its time-dependent change, which shows the advantage of the invention.
Figure 8:
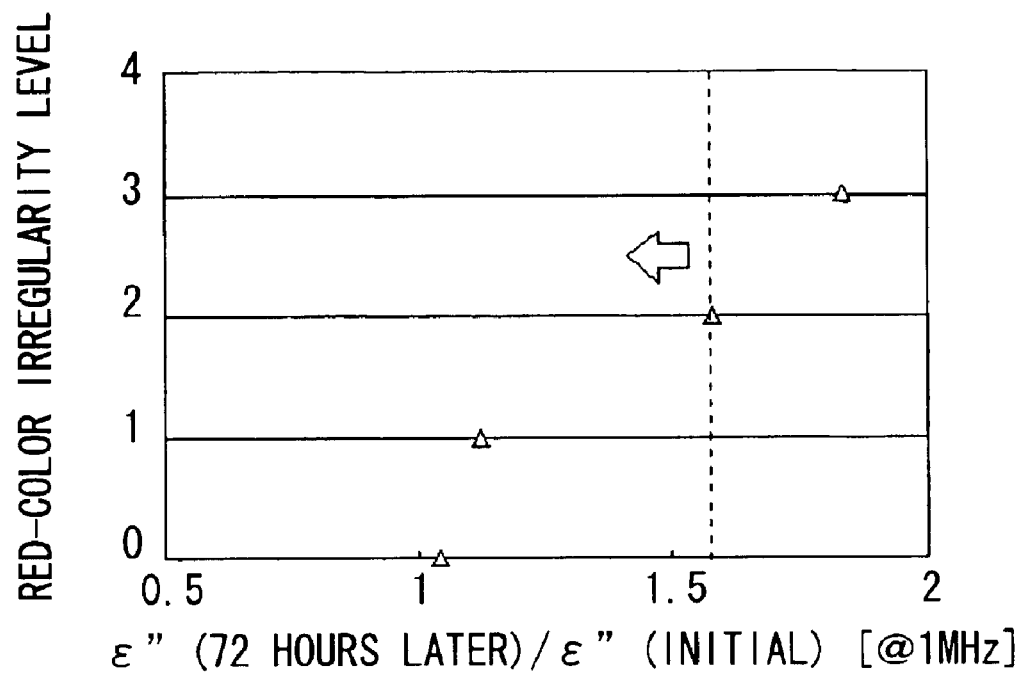
FIG. 8 is a graph showing the correlation between the time-dependent change of the dielectric loss factor and the red-color irregularity level, which shows the advantage of the invention.
Figure 9:
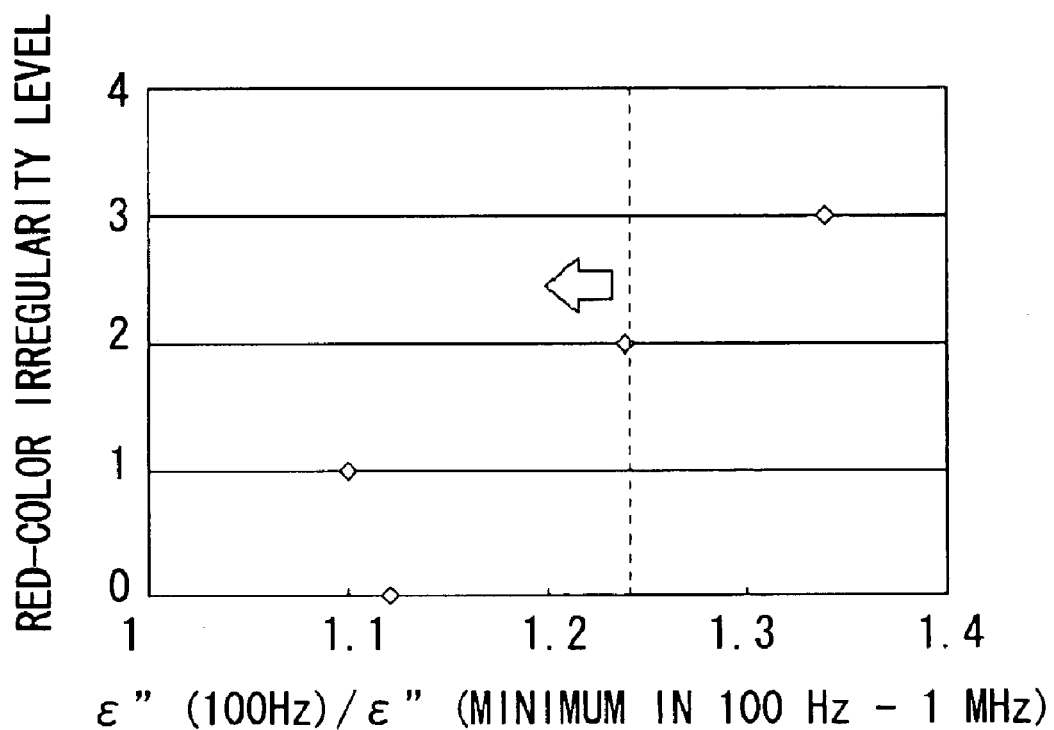
FIG. 9 is a graph showing the correlation between the frequency-characteristic profile of the dielectric loss factor and the red-color irregularity level, which shows the advantage of the invention.

Next, the invention is explained concretely with reference to FIGS. 2A to 9. FIGS. 2A and 2B show the configuration of each pixel of an IPS type LCD device according to an embodiment of the invention. FIG. 3 shows the correlation between the green pigment concentration (wt %) of the green sublayer of the color layer and the red-color irregularity level. FIG. 4A to FIG. 7B show the frequency characteristic of the dielectric constant and the dielectric loss factor of the samples A to D each having a specific green pigment concentration and their time-dependent change, respectively. FIG. 8 shows the correlation between the time-dependent change of the dielectric loss factor and the red-color irregularity level. FIG. 9 shows the correlation between the frequency characteristic profile of the dielectric loss factor and the red-color irregularity level.

The advantage of the present invention is obtainable in LCD devices each having no electrodes on the CF substrate, a typical example of which is the IPS mode LCD device.

As shown in FIGS. 2A and 2B, the IPS mode LCD device according to the embodiment of the invention comprises a first substrate (i.e., a TFT substrate) S1, a second substrate (i.e., a CF substrate) S2 located parallel to the substrate S1, and a liquid-crystal layer 10 sandwiched by these substrates S1 and S2.

The TFT substrate S1 comprises a first transparent plate 1, an interlayer dielectric layer 4 formed on the inner surface of the plate 1, a passivation layer 8 formed on the layer 4, and an alignment layer 9a formed on the layer 8. Scanning lines 2 are formed in parallel to each other on the plate 1. Signal lines 6 are formed in parallel to each other on the layer 4. The scanning lines 2 and the signal lines 6 are perpendicular to each other, forming pixel areas at their intersections. TFTs 5 are formed at the respective pixel areas (i.e., the respective intersections of the scanning lines 2 and the signal lines 6) in a matrix array. In each of the pixel areas, a pixel electrode 7 and a common electrode 3 are formed in such a way as to form comb teeth. The pixel electrodes 7 are electrically connected to the corresponding TFTs 5. All the common electrodes 3 arranged at the respective pixels are electrically connected to each other by way of common electrode lines (not shown), to which a common electric potential is applied on operation. The longitudinal axes of the pixel electrodes 7 and the common electrodes 3 are parallel to the signal lines 6. By applying electric potential difference across the electrodes 7 and 3, electric field perpendicular to the longitudinal axes is generated in such a way as to be approximately parallel to the substrates S1 and S2.

The CF substrate S2 comprises a second transparent plate 11. A patterned black matrix 12 for preventing unwanted light from penetrating through the substrate S2 and a patterned color layer 13 for displaying color images are formed on the inner surface of the plate 11. The matrix 12 and the layer 13 cover almost all the inner surface of the plate 11. The layer 13 includes sublayers for red (R), green (G), and blue (B) colors, which are arranged in a regular arrangement (e.g., the delta or mosaic arrangement, or the like) in such a way as to oppose the corresponding pixels. The gaps among the adjoining R, G, or B sublayers are covered with the matrix 12. An overcoat layer 14, which is made of a resin, is formed on the black matrix 12 and the color layer 13 to protect the same. The combination of the black matrix 12, the color layer 13, and the overcoat layer 14 is termed the color filter (CF). An alignment layer 9b is formed on the layer 14. On the other hand, a conductive layer 15 is formed on the outer surface of the plate 11.

The alignment layers 9a and 9b, which are opposite to each other by way of the liquid-crustal layer 10, are used to align homogeneously the liquid-crystal molecules in the layer 10 in a predetermined direction (i.e., the initial alignment direction), which has specified angle with respect to the longitudinal axis of the pixel electrodes 7.

A polarizer plate 16a is attached to the outer surface of the first plate 1. A polarizer plate 16b is attached to the outer surface of the conductive layer 15. The polarization axis of the plate 16a is perpendicular to that of the plate 16b. One of the polarization axes of the plates 16a and 16b is set to be parallel to the above-described initial alignment direction of the liquid-crystal molecules.

On operation, electric potential is selectively applied to the pixel electrodes 7 as necessary by way of the TFTs 5 while a common electric potential is applied to all the common electrodes 3 by way of the common electrode lines (not shown), thereby forming lateral electric field between the pixel electrodes 7 and the corresponding common electrodes 3. Thus, in the selected pixels, the liquid-crystal molecules are rotated (in other words, the molecules are twisted) in a plane parallel to the substrates S1 and S2, thereby displaying desired images on the screen.

As explained above, with the IPS mode LCD device according to the embodiment of the invention, the electric field for driving the liquid-crystal layer 10 is formed by the pixel electrodes 7 and the common electrodes 3 both of which are provided on the TFT substrate S1. Therefore, unlike the TN mode LCD device, no opposite electrode is provided on the CF substrate S2. As a result, the electric field for driving the liquid-crystal layer 10 penetrates through the color layer 13 formed on the CF substrate S2.

The color layer 13 is formed by the R, G, and B sublayers. Each of the R, G, and B sublayers is made of a specific coloring composition where a pigment for its specific color is distributed in a resin. The G-coloring (i.e., green-coloring) composition, which is used for the G sublayer, is mainly made of green and yellow pigments distributed in a resin. As the green (G) pigment, copper phthalocyanine halide where the replaced halogen is usually chlorine or bromine has been extensively used. This type of G pigment is polarized by application of electric field to generate electric charge. Since positive charge and negative charge are different in the flowing tendency through the G sublayer from each other and at the same time, the color layer 13 and the black matrix 12 are high in electric resistance, the charge generated by the G pigment is likely to accumulate in the green sublayer itself. In addition, the knowledge that positive charge and negative charge are different in the flowing tendency through the G sublayer from each other was newly found by the inventors.

When the green sublayer (and therefore, the color layer 13) is electrified by the accumulated charge, electric field is generated between the color layer 13 and the TFT substrate S1. The electric field thus generated will apply a bad effect to the distribution of the driving lateral electric field generated by the pixel electrodes 7 and the common electrodes 3, thereby changing the alignment direction of the liquid-crystal molecules in the liquid-crystal layer 10 in the vicinity of the green sublayers of the color layer 13. As a result, the transmittance of the liquid-crystal layer 10 is decreased and the wavelength component of green of the transmitted light is reduced, generating the red-color irregularity. The phenomenon that the green sublayer (and the color layer 13) is electrified will occur in the red and blue sublayers as well. However, this phenomenon is observed conspicuously or remarkably in the green sublayer.

Accordingly, to verify the correlation between the electrification of the green sublayer and the red-color irregularity, the inventors fabricated color filters having different weight ratios of the green pigment (i.e., copper phthalocyanine halide) to the green-coloring composition and tested the level of generation of the red-color irregularity. The red-color irregularity, which was qualitatively determined by visual recognition, was classified into five levels or steps (i.e., Level 0 to 4) shown in Table 1 below. The red-color irregularity level was observed under the following condition.

The LCD device was controlled in such a way as to be in the white displaying state and then, one of the inventors contacted his/her finger onto the screen of the device at a specific pressing force. Thereafter, the inventors observed the subsequent behavior of the print of the finger left on the screen.

TABLE 1

| RED-COLOR IRREGULARITY LEVEL | CONTENT |
|---|---|
| 0 | NO PRINT WAS GENERATED. |
| 1 | PRINT WAS GENERATED BY CONTACTING FINGER, BUT DISAPPEARED (RECOVERED) IMMEDIATELY. |
| 2 | PRINT WAS SLIGHTLY GENERATED BY CONTACTING FINGER, BUT DISAPPEARED (RECOVERED) SOON. |
| 3 | PRINT WAS SLIGHTLY GENERATED BY CONTACTING FINGER, AND DID NOT DISAPPEAR (RECOVER). |
| 4 | PRINT WAS GENERATED BY CONTACTING FINGER, AND DID NOT DISAPPEARED (RECOVERED). |

Generally, the permissible range of the red-color irregularity is lower than the level 2; in other words, the levels 1 and 0 are permissible.

The inventors made the samples A to D and used them for the above-described red-color irregularity test. The samples A to D have different concentrations of green-coloring pigment in the green-coloring composition as shown as Table 2 below. The red-color irregularity level of the samples A to D obtained by the said test was also shown in Table 2 and FIG. 3.

TABLE 2

| SAMPLES | GREEN-COLORING PIGMENT CONCENTRATION (Wt %) | RED-COLOR IRREGULARITY LEVEL |
| --- | --- | --- |
| SAMPLE A | 19.9 | 0 |
| SAMPLE B | 25.5 | 1 |
| SAMPLE C | 27.0 | 2 |
| SAMPLE D | 28.4 | 3 |

As explained above, it was thought that the cause of the red-color irregularity was the generation of electric charge from the pigment (i.e., copper phthalocyanine halide) contained in the green-coloring composition forming the green sublayer. Therefore, as the concentrations of the pigment of the green-coloring composition was raised, the amount of the accumulated electric charge increased and as a result, the level of the red-color irregularity seemed to become worse proportional to the pigment concentration of the green-coloring composition. However, taking the test result shown in Table 2 and FIG. 3 into consideration, it was seen that the correlation between the pigment concentration of the green-coloring composition and the red-color irregularity level was not linear. Instead, it was seen that the red-color irregularity was remarkably prevented from occurring when the pigment concentration of the green-coloring composition was equal to or less than a specific threshold value. It was thought that this fact was caused by considerable change of distribution of the green pigment in the green-coloring composition.

Based on the above-described explanation, to keep the red-color irregularity level lower than the level 2 (which is in a substantially permissible range), the inventors found that the concentration ratio of the green pigment (i.e., copper phthalocyanine halide) in the green-coloring composition should be kept equal to approximately 27 wt % or lower.

Additionally, in the invention, the concentration ratio of the pigment (i.e., copper phthalocyanine halide) in the green-coloring composition means the concentration ratio measured in the state of the color filter where the color layer 13 (which includes the red, green, and blue sublayers) are formed and arranged regularly. This means that the concentration ratio of the pigment (i.e., copper phthalocyanine halide) in the green-coloring composition is a ratio obtained by excluding volatile components or ingredients such as a solvent.

The advantage of the invention is not dependent on the count and type/kind of halogen substituent. Yellow pigment may be added to the green pigment to adjust the color tone. In this case, the same advantage is obtainable if yellow pigment to be added is usable for the color filter. Any resin may be used as the resin to be used for the color layer 13 along with the pigment, if it is usable for the color filter.

In the above-described test, the concentration ratio of the green pigment (i.e., copper phthalocyanine halide) in the green-coloring composition was found to prevent the red-color irregularity beforehand. However, it is usual that a manufacturer determines the concentration ratio of a pigment contained in a coloring composition and that the manufacturer does not disclose the detailed arrangement or combination of the pigment. Therefore, even if a coloring composition containing a coloring pigment expresses no red-color irregularity in the initial state, there is a possibility that a red-color irregularity is observed after the LCD device is driven for a long time. Alternately, an initially observed red-color irregularity may become worse after the LCD device is driven or actually used for a long time.

The above-described time-dependent change of the possibility of the red-color irregularity is difficult to be predicted or presumed. Therefore, conventionally, after an electric-field stress is applied to a color filter for a specific period, a finger is contacted onto the screen with a specific pressing force. Thereafter, the initial and subsequent behavior of the print of the finger thus contacted is observed in order to judge the level of the red-color irregularity. If the level of the red-color irregularity observed exceeds a specific threshold, the said color filter is excluded as defective. However, this conventional method using the print of the finger left on the screen has a disadvantage that it is difficult to discriminate between the subtle levels of the red-color irregularity, and that the LCD device may be damaged by the pressing operation of a finger onto the screen. Thus, there has been the need to develop a method making it possible to surely evaluate the long-term reliability of a LCD device with a convenient and easy method.

To answer the said need, the inventors conducted various experiments or tests about the correlation between the time-dependent change of the red-color irregularity and the physical property of the color layer 13. As a result, they found that the time-dependent change of the red-color irregularity could be evaluated by using the dielectric loss factor of a coloring sublayer of the color layer 13 as an index.

Specifically, the permittivity is a physical property that applies a large effect to the electrification. Also, to drive a LCD device, an alternating-current (AC) voltage is applied to the LCD device. Thus, it was presumed that the change of the permittivity is unable to follow the time-dependent change of the AC voltage if electric charge exists in the color layer 13. This leaded to an idea that the frequency characteristic of the permittivity has a correlation with the red-color irregularity. Accordingly, the inventors evaluated the profile and the time-dependent change of the frequency characteristic of the complex permittivity (in particular, the dielectric loss factor), thereby presuming the level of the red-color irregularity. This is a new method created by the inventors of the invention.

To confirm the advantage of the inventor's method, in the same way as shown in the above test, the inventors made the samples A to D and conducted the test for this method using these samples. The samples A to D have different concentrations of green pigment in the green-coloring composition as shown in Table 2. Aluminum electrodes, color sublayers, an overcoat layer, and aluminum electrodes were successively formed on a glass plate, forming "sandwiched cells" for the samples A to D. A direct-current (DC) voltage of 5 V was applied to the respective samples A to D for 24 hours, 48 hours, or 72 hours. The complex permittivity of these samples was measured with a known LCR meter while applying an AC electric field to the samples A to D. In this way, the data of the complex permittivity was obtained after application of the DC voltage for 24 hours, 48 hours, and 72 hours, along with the initial data.

Here, when the complex permittivity is defined as $\epsilon^*$, $\epsilon^*$ is given as the combination of the real part $\epsilon'$ and the imaginary part $\epsilon''$, as shown in the following equation (1).

$$\epsilon^* = \epsilon' - i\epsilon'' \qquad (1)$$

In the equation (1), the real part $\epsilon'$ is termed the "dielectric constant" and the imaginary part $\epsilon''$ is termed the "dielectric loss factor".

Figure 4A:
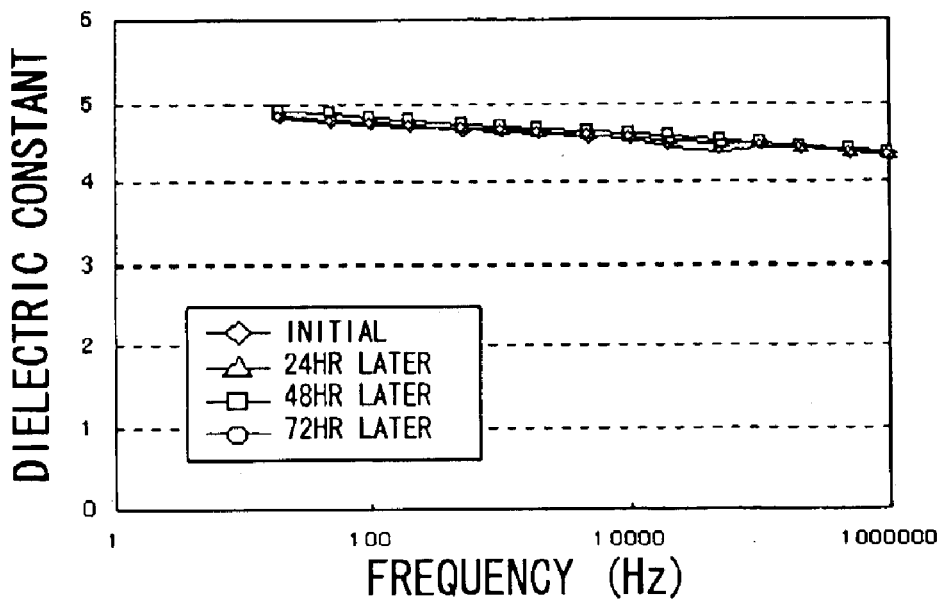
FIG. 4A is a graph showing the frequency characteristic of the dielectric constant of the sample A having a green pigment concentration of 19.9 wt % and its time-dependent change, which shows the advantage of the invention.
Figure 4B:
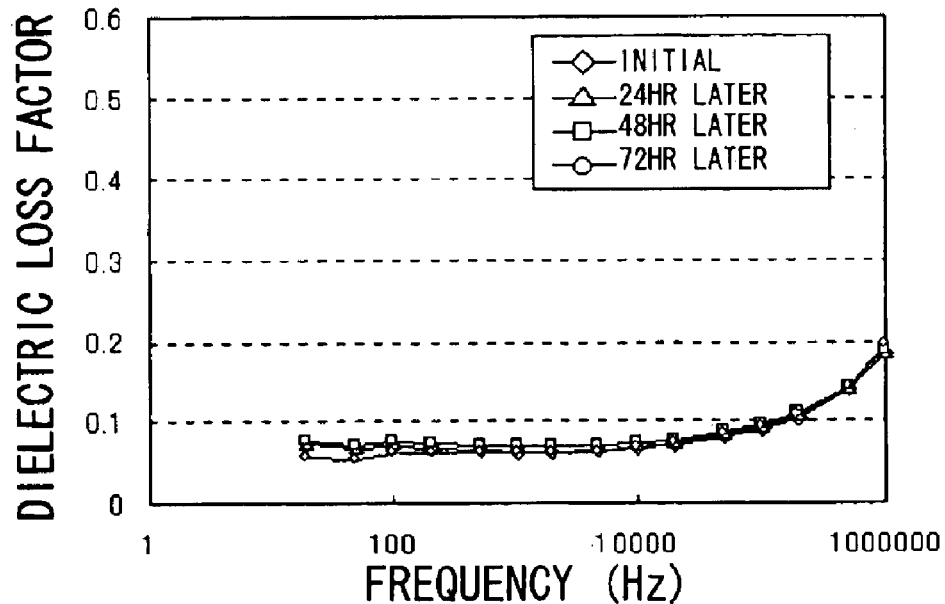
FIG. 4B is a graph showing the frequency characteristic of the dielectric loss factor of the sample A having a green pigment concentration of 19.9 wt % and its time-dependent change, which shows the advantage of the invention.
Figure 5A:
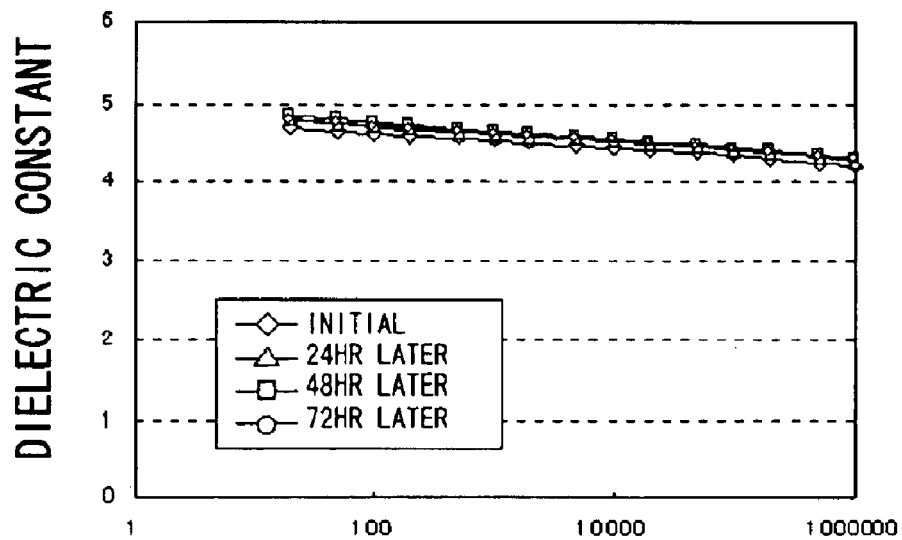
FIG. 5A is a graph showing the frequency characteristic of the dielectric constant of the sample B having a green pigment concentration of 25.5 wt % and its time-dependent change, which shows the advantage of the invention.
Figure 5B:
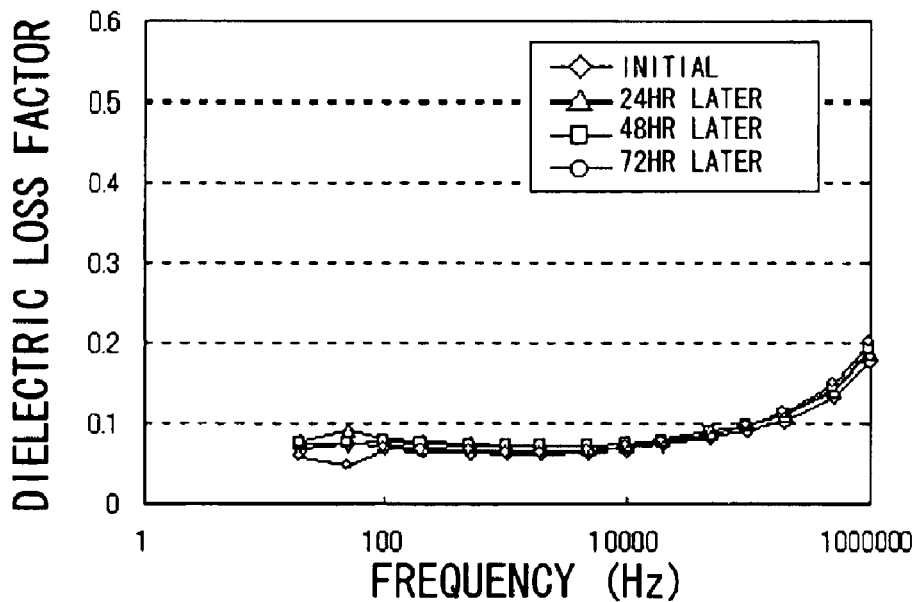
FIG. 5B is a graph showing the frequency characteristic of the dielectric loss factor of the sample B having a green pigment concentration of 25.5 wt % and its time-dependent change, which shows the advantage of the invention.

The result of the test for the above-described evaluation method of the invention is shown in FIGS. 4A and 4B, 5A and 5B, 6A and 6B, and 7A and 7B. FIGS. 4A and 4B show the dielectric constant and dielectric loss factor and their time-dependent changes of the sample A, respectively. FIGS. 5A and 5B show the dielectric constant and dielectric loss factor and their time-dependent changes of the sample B, respectively. FIGS. 6A and 6B show the dielectric constant and dielectric loss factor and their time-dependent changes of the sample C, respectively. FIGS. 7A and 7B show the dielectric constant and dielectric loss factor and their time-dependent changes of the sample D, respectively. In these figures, the rhombus, triangle, square, and round markers denote the data in the initial state, and the subsequent states after 24 hours, after 48 hours, and after 72 hours, respectively.

As seen from FIGS. 4A to 7A, the dielectric constant $\epsilon'$ decreases gradually with the increasing frequency, and the tendency and value of the dielectric constant $\epsilon'$ do not show considerable changes dependent on the green pigment concentration in the green-coloring composition. Unlike this, the dielectric loss factor $\epsilon''$ increases gradually with the increasing frequency (for example, FIG. 4B). Alternately, the dielectric loss factor $\epsilon''$ decreases and then, increases as the frequency increases (for example, FIG. 7B). Moreover, the value of $\epsilon''$ varies considerably between the low-frequency region (near 100 Hz) and the high-frequency region (near 1 MHz). The time-dependent change of both the dielectric constant $\epsilon'$ and the dielectric loss factor $\epsilon''$ increases as the pigment concentration ratio increases, where the amount of change of the dielectric loss factor $\epsilon''$ is greater than that of the dielectric constant $\epsilon'$. Accordingly, to evaluate the frequency characteristic and its time-dependency, it was found by the inventors that the dielectric loss factor $\epsilon''$ was more preferred to the dielectric constant $\epsilon'$.

Furthermore, paying the attention to the dielectric loss factor $\epsilon''$, it is seen that the dielectric loss factor $\epsilon''$ of the sample D having a relatively large pigment concentration increases from the low-frequency region to the high-frequency region and that the time-dependent change of $\epsilon''$ of the sample D is relatively larger in the high-frequency region. Therefore, even if the pigment concentration of a coloring composition is unknown, the red-color irregularity can be presumed by measuring the time-dependent change of the factor $\epsilon''$ in the high-frequency region (e.g., at 1 MHz) and by obtaining the rate or the change thereof.

FIG. 8 was obtained by plotting the ratio of the subsequent value of the dielectric loss factor $\epsilon''$ after 72 hours at 1 MHz to the initial value thereof shown in FIGS. 4B to 7B and the red-color irregularity level. It is seen from FIG. 8 that the larger the ratio of $\epsilon''$ (72 hours later) to $\epsilon''$ (initial) (i.e., the rate of change of $\epsilon''$), the higher the red-color irregularity. Therefore, by obtaining the rate of change of the dielectric loss factor $\epsilon''$, it can be known whether a LCD device has a potential defect leading to the red-color irregularity. If the dielectric loss factor $\epsilon''$ (72 hours later) is equal to or less than approximately 1.6 times the dielectric loss factor $\epsilon''$ (initial), the red-color irregularity level can be kept lower than the level 2 shown in Table 1, in other words, it can be kept in the permissible range.

Observing the profile or shape of the frequency characteristic of the dielectric loss factor $\epsilon''$ shown in FIGS. 4B to 7B, it is seen from the sample D (FIG. 7B) having the largest pigment concentration that the dielectric loss factor $\epsilon''$ is large in the low-frequency region (near 100 Hz) and the high-frequency region (near 1 MHz) and small in the middle-frequency region (near 10 kHz). Thus, the frequency characteristic of the sample D has a concave or depressed profile. On the other hand, with the samples A to C having the pigment concentrations lower than the sample D, the frequency characteristic approaches a flat one in the low- and middle-frequency regions.

It was thought that the difference of the frequency characteristic profile was due to the distribution difference of the green pigment in the coloring sublayer and the relationship between the coloring sublayers and other constituting elements. Based on the difference of the frequency characteristic profile, the concentration of the green pigment and the time-dependent red-coloring irregularity can be presumed. Moreover, by using the frequency characteristic approximately flat in the low- and middle-frequency regions (in other words, the frequency characteristic profile having no protrusion or raised area) as an index, the sample having a possibility that the red-color irregularity occurs after a specific time has passed can be discriminated and excluded.

FIG. 9 was obtained by plotting the ratio of the value of the dielectric loss factor $\epsilon''$ near a 100 Hz to the minimum value thereof in the range from 100 Hz to 1 MHz shown in FIGS. 4B to 7B and the red-color irregularity level. It is seen from FIG. 9 that the larger the ratio of $\epsilon''$ (100 Hz) to $\epsilon''$ (minimum in 100 Hz–1 MHz) (i.e., the deeper the concave of the frequency characteristic profile of $\epsilon''$ in the middle region), the higher the red-color irregularity. Therefore, by obtaining the ratio of change of the dielectric loss factor $\epsilon''$, it can be known whether a LCD device has a potential defect leading to the red-color irregularity. If the dielectric loss factor $\epsilon''$ (100 Hz) to $\epsilon''$ (minimum in 100 Hz–1 MHz) is equal to or less than approximately 1.25 times the dielectric loss factor $\epsilon''$ (minimum in 100 Hz–1 MHz), the red-color irregularity level can be kept lower than the level 2 shown in Table 1, in other words, it can be kept in the permissible range.

In the above-described tests or experiments, the overcoat layer 14 was made of the same material as used in the conventional LCD device. However, taking the electrification of the green pigment into consideration, the material of the layer 14 seemed to have an effect to the said electrification. Specifically, if the dielectric constant of the overcoat layer 14 is increased, the layer 14 becomes likely to be electrified. Therefore, the electrified green pigment is likely to be affected by the overcoat layer 14 and thus, the frequency characteristic of the permittivity seems to change. Actually, in the inventors' test carried out using the overcoat layer 14 while changing its permittivity, a result that the red-color irregularity was more likely to occur when the permittivity of the layer 14 was relatively large were obtained. Therefore, it was important to select the material of the overcoat layer 14 from the viewpoint of the permittivity.

In addition, the color filter may be fabricated by any method, for example, printing method, photolithography method, etching method, or the like. However, the photolithography method is preferred because of its good controllability and reproducibility for high resolution and spectral characteristics. In the photolithography method, a pigment is distributed in a transparent resin. On the other hand, an optical polymerization initiator and a polymerizable monomer are distributed in an appropriate solvent. Thereafter, they are mixed together to form a coloring composition. The composition is then coated on the surface of a transparent plate and selectively exposed to light and developed, thereby patterning the coloring composition layer for one color, e.g., red. The same processes are repeated twice for green and blue colors. As a result, the red, green, and blue sublayers of the color layer 13 are arranged on the plate in such a way as to form a delta or mosaic arrangement, or the like.

EXAMPLES

To describe the invention more concretely, examples are explained below.

Example 1

The inventors actually fabricated the samples in the following way and measured the ratio of the dielectric loss factor $\epsilon''$ (72 hours later) to the dielectric loss factor $\epsilon''$ (initial) at 1 MHz and the ratio of the dielectric loss factor $\epsilon''$ (100 Hz) to dielectric loss factor $\epsilon''$ (minimum in 100 Hz–1 MHz)

(Fabrication of Color Filter)

A resin composition containing carbon particles was deposited on the surface of the second transparent plate 11 to have a thickness of approximately 1.3 µm and patterned, thereby forming the black matrix 12 for blocking the unwanted light. Thereafter, a coloring composition was coated on the plate 11 to cover the matrix 12 with a spin coater and dried in an oven. The coloring composition layer thus formed was selectively exposed to light using a mask and developed, cleaned with water, and post-baked, thereby forming coloring sublayers for one of the three colors R, G, and B on the plate 11. The same process steps were repeated for other two colors. In this way, red, green, and blue sublayers were formed on the plate 11 in a specific pattern such as a mosaic pattern along with the black matrix 12. The concentration ratio of the green pigment for the green sublayers was 19.9 wt %. The thickness of the red, green, and blue sublayers was 2.0 µm, 2.1 µm, and 2.1 µm, respectively. These R, G, and B sublayers, which constitute the color layer 13, were formed to satisfy the chromaticity defined by the EBU standard.

Subsequently, a resin solution was coated with a spin coater and cured with an oven, thereby forming the overcoat layer 14 on the plate 11 to cover the color layer 13. The layer 14 had a thickness of approximately 1.0 µm.

(Fabrication of TFT Substrate)

On the first transparent plate 1, a chromium (Cr) layer with a thickness of approximately 250 nm was deposited and patterned, thereby forming the scanning lines 2, the common electrodes lines, and the common electrodes 3. A silicon nitride (SiNx) layer with a thickness of approximately 400 nm, which was used for the gate dielectrics of the TFTs 5, was deposited. Then, an i-type amorphous silicon (Si) layer with a thickness of approximately 300 nm and a n-type amorphous Si layer with a thickness of approximately 30 nm was successively deposited. These two amorphous Si layers were patterned to form Si islands for the TFTs 5. Subsequently, the interlayer dielectric layer 4 was deposited and then, a Cr layer with a thickness of approximately 250 nm was deposited thereon. The Cr layer thus deposited was patterned to form the signal lines 6 and the pixel electrodes 7. As the passivation layer 8, a SiNx layer with a thickness of approximately 200 nm was then deposited. The SiNx layer thus deposited was selectively removed in the pulling-out areas of the scanning lines 2 and the signal lines 6.

(Fabrication of LCD Panel)

The alignment layers 9a and 9b were formed on the inner surfaces of the passivation layer 8 of the TFT substrate S1 and the overcoat layer 14 of the CF substrate S2 by coating, respectively. A rubbing process was then conducted to the layers 9a and 9b in a direction at 15° with respect to the longitudinal axis of the pixel electrodes 7. Thereafter, a sealing material was coated in the peripheral area of the substrate S1 or S2 and spacers were distributed in the inner surfaces of the substrate S1 and S2. The TFT substrate S1 and the CF substrate S2 were then coupled together. A liquid crystal was injected into the space between the substrates S1 and S2 by way of a hole or holes and then, the hole or holes was/were closed. The cell gap of the liquid-crystal layer 10 was set at 4.5 µm. The liquid crystal injected had a refractive index anisotropy Δn of 0.70. The polarization axis of the polarizer plate 16b was set parallel to the rubbing direction. The polarization axis of the polarizer plate 16a was set perpendicular to the rubbing direction. In this way, the LCD panel according to the example 1 of the invention was fabricated.

The LCD panel of the example 1 thus fabricated was continuously operated in a heating chamber at 60° C. for 600 hours to apply an electric-field stress to the panel. However, no red-color irregularity was observed. With the green sublayer used in this panel, which was formed according to the invention, the ratio of the dielectric loss factor $\epsilon''$ (100 Hz) to dielectric loss factor $\epsilon''$ (minimum in 100 Hz–1 MHz) was 1.25 and the ratio of the dielectric loss factor $\epsilon''$ (600 hours later) to the dielectric loss factor $\epsilon''$ (initial) at 1 MHz while applying an electric-field stress to the panel was 1.21.

Comparative Example 1

An LCD panel of the comparative example 1 was fabricated in the same way as the above-described example 1 except for the following:

The concentration ratio of the green pigment for the green sublayers was set at 28.4 wt %. The thickness of the red, green, and blue sublayers was 2.0 µm, 1.9 µm, and 2.1 µm, respectively.

The LCD panel of the comparative example 1 thus fabricated was continuously operated in a heating chamber at 60° C. for 600 hours while applying an electric-field stress to the panel. As a result, a serious or terrible red-color irregularity of the level 4 was observed. With the green sublayer used in this panel, the ratio of the dielectric loss factor $\epsilon''$ (100 Hz) to dielectric loss factor $\epsilon''$ (minimum in 100 Hz–1 MHz) was 2.88 and the ratio of the dielectric loss factor $\epsilon''$ (600 hours later) to the dielectric loss factor $\epsilon''$ (initial) at 1 MHz was 2.05.

Comparing the results of the Example 1 and the Comparative Example 1, even if the pigment concentration of the green sublayer was unknown, the red-color irregularity washable to be presumed by measuring the ratio of the dielectric loss factor $\epsilon''$ (100 Hz) to dielectric loss factor $\epsilon''$ (minimum in 100 Hz–1 MHz) and the ratio of the dielectric loss factor $\epsilon''$ (600 hours later) to the dielectric loss factor $\epsilon''$ (initial) at 1 MHz. As a result, it was confirmed that the long-term reliability of a LCD device could be known conveniently and easily, which was realized without complicating the fabrication processes of the color filter.

Variations

In the above-described explanation, the IPS mode LCD device is taken as an example because it is a typical one. However, the invention is not limited to the embodiment and the example 1. The invention is applicable to any other type of a LCD device where no electrodes are formed on the CF substrate S2 in such a way as to be located on the side nearer to the liquid-crystal layer 10 with respect to the color layer 13.

Moreover, the above-described explanation refers to the relationship between the green pigment of the green sublayer and the red-color irregularity. However, the invention is applicable to any other relationship between a pigment and a sublayer for another color and irregularity other than red color, if unwanted electric charge is generated in the sublayer due to applied electric field.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A LCD device comprising:
   a first substrate on which switching elements are formed;
   a second substrate on which a color layer is formed;
   the color layer having a red sublayer, a green sublayer, and a blue sublayer;
   a liquid-crystal layer located between the first and second substrates; and
   the second substrate including no electrodes formed in such a way as to be located on a side nearer to the liquid-crystal layer with respect to the color layer;
   wherein a green-coloring composition forming the green sublayer contains a pigment having a copper phthalocyanine skeleton;
   and wherein a ratio in :weight of the pigment with respect to the green-coloring composition is equal to or less than approximately 27%.

2. The device according to claim 1, wherein when an alternating-current electric field of 100 Hz to 1 MHz is applied to the color layer, a dielectric loss factor of the color layer satisfies a relationship of $$(\epsilon''_{100}/\epsilon''_{min}) < \text{approximately } 1.25$$

where $\epsilon''_{100}$ is a value of the dielectric loss factor at approximately 100 Hz, and $\epsilon''_{min}$ is a minimum value of the dielectric loss factor in a range from 100 Hz to 1 MHz.

3. The device according to claim 1, wherein when an alternating-current electric field of 1 MHz is applied to the color layer, a dielectric loss factor of the color layer satisfies a relationship of $$(\epsilon''_{subsequent}/\epsilon''_{initial}) < \text{approximately } 1.6$$

where $\epsilon''_{initial}$ is an initial value of the dielectric loss factor, and $\epsilon''_{subsequent}$ is a subsequent value of the dielectric loss factor obtained after a dielectric-current electric field is applied to the color layer as an electric-field stress for at least 72 hours.

4. The device according to claim 1, wherein a chromaticity range is set at 65% or higher.

5. The device according to claim 1 wherein the first substrate has scanning lines, signal lines extending perpendicular to the scanning lines, pixel electrodes formed at respective intersections of the scanning lines and the signal lines, and common electrodes applied commonly with an electric potential, thereby constituting an In-Plane Switching structure where liquid-crystal molecules in the liquid-crystal layer are rotated by a voltage applied across the pixel electrodes and the common electrodes in a plane approximately parallel to the first and second substrates.

6. A LCD device comprising:
   a first substrate on which witching elements are formed;
   a second substrate on which a color layer is formed;
   the color layer having a red sublayer, a green sublayer, and a blue sublayer;
   the green sublayer being formed by a green-coloring composition;
   a liquid-crystal layer located between the first and second substrates; and
   the second substrate including no electrodes formed in such a way as to be located on a side nearer to the liquid-crystal layer with respect to the color layer;
   wherein when an alternating-current electric field of 100 Hz to 1 MHz is applied to the color layer, a dielectric loss factor of the color layer satisfies a relationship of $$(\epsilon''_{100}/\epsilon''_{min}) < \text{approximately } 1.25$$

where $\epsilon''_{100}$ is a value of the dielectric loss factor at approximately 100 Hz, and $\epsilon''_{min}$ is a minimum value of the dielectric loss factor in a range from 100 Hz to 1 MHz.

7. The device according to claim 6, wherein the green-coloring composition contains a pigment having a copper phthalocyanine skeleton.

8. The device according to claim 6, wherein a chromaticity range is set at 65% or higher.

9. The device according to claim 6, wherein the first substrate has scanning lines, signal lines extending perpendicular to the scanning lines, pixel electrodes formed at respective intersections of the scanning lines and the signal lines, and common electrodes applied commonly with an electric potential, thereby constituting an In-Plane Switching structure where liquid-crystal molecules in the liquid-crystal layer are rotated by a voltage applied across the pixel electrodes and the common electrodes in a plane approximately parallel to the first and second substrates.

10. A LCD device comprising:
    a first substrate on which switching elements are formed;
    a second substrate on which a color layer is formed;
    the color layer having a red sublayer, a green sublayer, and a blue sublayer;
    the green sublayer being formed by a green-coloring composition;
    a liquid-crystal layer located between the first and second substrates; and
    the second substrate including no electrodes formed in such a way as to be located on a side nearer to the liquid-crystal layer with respect to the color layer;
    wherein when an alternating-current electric field of 1 MHz is applied to the color layer, a dielectric loss factor of the color layer satisfies a relationship of $$(\epsilon''_{subsequent}/\epsilon''_{initial}) < \text{approximately } 1.6$$

where $\epsilon''_{initial}$ is an initial value of the dielectric loss factor, and $\epsilon''_{subsequent}$ is a subsequent value of the dielectric loss factor obtained after a dielectric-current electric field is applied to the color layer as an electric-field stress for at least 72 hours.

11. The device according to claim 10, wherein the green-coloring composition contains a pigment having a copper phthalocyanine skeleton.

12. The device according to claim 10, wherein a chromaticity range is set at 65% or higher.

13. The device according to claim 10, wherein the first substrate has scanning lines, signal lines extending perpendicular to the scanning lines, pixel electrodes formed at respective intersections of the scanning lines and the signal lines, and common electrodes applied commonly with an electric potential, thereby constituting an In-Plane Switching structure where liquid-crystal molecules in the liquid-crystal layer are rotated by a voltage applied across the pixel electrodes and the common electrodes in a plane approximately parallel to the first and second substrates.

* * * * *